(12) United States Patent
Tanaka et al.

(10) Patent No.: US 10,082,267 B2
(45) Date of Patent: Sep. 25, 2018

(54) VEHICLE LAMP AND VEHICLE HAVING THE VEHICLE LAMP

(71) Applicant: KOITO MANUFACTURING CO., LTD., Tokyo (JP)

(72) Inventors: Hidetada Tanaka, Shizuoka (JP);
Takeshi Masuda, Shizuoka (JP);
Yuichi Shibata, Shizuoka (JP);
Mitsuyuki Mochizuki, Shizuoka (JP);
Tsukasa Tokida, Shizuoka (JP);
Kentaro Tani, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 13 days.

(21) Appl. No.: 15/468,486

(22) Filed: Mar. 24, 2017

(65) Prior Publication Data
US 2017/0276312 A1 Sep. 28, 2017

(30) Foreign Application Priority Data
Mar. 25, 2016 (JP) .................... 2016-062063

(51) Int. Cl.
| | |
|---|---|
| *F21V 17/02* | (2006.01) |
| *F21S 8/10* | (2006.01) |
| *B60Q 1/04* | (2006.01) |
| *B60Q 1/08* | (2006.01) |
| *F21S 41/143* | (2018.01) |

(Continued)

(52) U.S. Cl.
CPC ............ *F21S 48/1789* (2013.01); *B60Q 1/04* (2013.01); *B60Q 1/085* (2013.01); *F21S 41/143* (2018.01); *F21S 41/147* (2018.01); *F21S 41/255* (2018.01); *F21S 41/43* (2018.01); *F21S 41/663* (2018.01); *F21S 41/686* (2018.01); *F21S 41/692* (2018.01); *F21S 41/695* (2018.01); *B60Q 2200/30* (2013.01); *B60Q 2300/45* (2013.01)

(58) Field of Classification Search
CPC .............. F21S 48/1789; F21S 48/1773; F21S 48/1747; F21S 48/1159; F21S 48/1784; F21S 48/145; F21S 48/1258; F21S 48/1154; F21S 48/1291; B60Q 1/04; B60Q 1/085; B60Q 2200/30; B60Q 2300/45
USPC .................................. 362/509, 512
See application file for complete search history.

(56) References Cited

U.S. PATENT DOCUMENTS

| | | | | |
|---|---|---|---|---|
| 5,718,505 A | * | 2/1998 | Daumueller | F21S 48/145 362/279 |
| 5,842,774 A | * | 12/1998 | Sur | B60Q 1/444 340/479 |

(Continued)

FOREIGN PATENT DOCUMENTS

| | | |
|---|---|---|
| EP | 2399777 A2 | 12/2011 |
| JP | 2012-6482 A | 1/2012 |

*Primary Examiner* — Evan Dzierzynski
*Assistant Examiner* — Omar Rojas Cadima
(74) *Attorney, Agent, or Firm* — Osha Liang LLP (57) ABSTRACT

A vehicle lamp includes a light source configured to draw a road surface, a projection lens configured to transmit light emitted from the light source, and a movable shade disposed in the vicinity of a rear focal point of the projection lens. The movable shade includes at least one plate-shaped shade which has a light-shielding surface along a direction orthogonal to an optical axis of the projection lens. The at least one plate-shaped shade is formed with at least one light-transmitting part having an enclosed shape.

18 Claims, 9 Drawing Sheets

(51) Int. Cl.
*F21S 41/147* (2018.01)
*F21S 41/255* (2018.01)
*F21S 41/43* (2018.01)
*F21S 41/663* (2018.01)
*F21S 41/686* (2018.01)
*F21S 41/692* (2018.01)
*F21S 41/695* (2018.01)

(56) References Cited

U.S. PATENT DOCUMENTS

| | | | |
|---|---|---|---|
| 7,284,888 B2 * | 10/2007 | Pauty | F21S 48/1789 362/303 |
| 2005/0180144 A1 * | 8/2005 | Stout | F21S 48/145 362/307 |

* cited by examiner

FIG.14

VEHICLE LAMP AND VEHICLE HAVING THE VEHICLE LAMP

CROSS-REFERENCE TO RELATED APPLICATION

This application claims priority from Japanese Patent Application No. 2016-062063 filed on Mar. 25, 2016, the entire contents of which are incorporated herein by reference.

FIELD

The present invention relates to a vehicle lamp having a movable shade and a vehicle having the vehicle lamp.

A lamp unit which has a light source, a rotary shade, a reflector and a projection lens in a housing is disclosed in Patent Document 1. The rotary shade is rotatable by the driving of a motor, or the like. When a shade plate or a cut-out portion for forming a desired light distribution pattern is moved onto an optical axis, at least a part of light irradiated from the light source is shielded to form a low-beam light distribution pattern or a high-beam light distribution pattern.

Patent Document 1: Japanese Patent Laid-Open Publication No. 2012-006482

The rotary shade disclosed in Patent Document 1 is intended for forming a low-beam light distribution pattern or a high-beam light distribution pattern, as described above. However, it is difficult to form a light distribution pattern (a drawing mark) which is used for drawing a road surface, for example, and has a relatively narrow irradiation range. Further, it is desirable to make the position or number of the drawing mark variable in accordance with road conditions or surrounding environments.

SUMMARY

The embodiments of the present invention aim to provide a vehicle lamp capable of properly changing an irradiation position of a light distribution pattern drawn on a road surface and a vehicle having the vehicle lamp.

For example, a vehicle lamp includes:
a light source configured to draw a road surface;
a projection lens configured to transmit light emitted from the light source; and
a movable shade disposed in the vicinity of a rear focal point of the projection lens,
wherein the movable shade comprises at least one plate-shaped shade which has a light-shielding surface along a direction orthogonal to an optical axis of the projection lens, and
wherein the at least one plate-shaped shade is formed with at least one light-transmitting part having an enclosed shape.

According to this configuration, it is possible to provide the vehicle lamp capable of easily changing an irradiation position of a light distribution pattern drawn on a road surface.

It is desirable that the at least one light-transmitting part is moved by rotating the movable shade.

Preferably, the movable shade is constituted by a disc-shaped shade,
the disc-shaped shade has a rotational axis parallel to the optical axis and an opening portion which is formed so as to extend in an outer peripheral direction from a center of the disc-shaped shade and thus constitutes the at least one light-transmitting part, and
the disc-shaped shade is rotated around the rotational axis.

According to this configuration, it is possible to reduce the size of the movable shade which changes the irradiation position of the light distribution pattern.

Preferably, the movable shade is constituted by a cylinder or a part of a cylinder.

Preferably, the movable shade is rotated about a rotational axis along a horizontal direction or a vertical direction.

According to this configuration, it is possible to continuously change the irradiation position of the desired light distribution pattern.

Preferably, the light-transmitting part is constituted by a plurality of linear opening portions which extends long in a direction perpendicular to a rotation direction or in a direction inclined with respect to the rotation direction.

According to this configuration, it is possible to draw a plurality of linear light distribution patterns on a road surface by rotating a cylindrical movable shade having the plurality of linear opening portions.

Preferably, the vehicle lamp further includes a fixed shade disposed between the light source and the movable shade, and
the fixed shade is provided at a position where the fixed shade is capable of shielding light emitted toward at least a part of the movable shade in the rotation direction.

According to this configuration, it is possible to make the irradiation position or number of the drawing mark variable by shielding a part of light incident to the movable shade by the fixed shade. Further, the irradiation position or irradiation number of the linear light distribution pattern (e.g., laterally long line) is controlled by combining the fixed shade with the movable shade having a plurality of linear opening portions. Therefore, it is also possible to form a light distribution pattern in which the laterally long lines are sequentially drawn toward an object such as a pedestrian.

Preferably, the movable shade is rotated about a rotational axis along the horizontal direction or the vertical direction, so that the movable shade is movable to a position where the movable shade does not shield light which travels from the light source toward the projection lens through the fixed shade.

According to this configuration, it is possible to form, for example, a light distribution pattern for forward irradiation, such as a high beam, by fully opening the movable shade with respect to the fixed shade.

Further, a vehicle may comprise the vehicle lamp described above.

According to this configuration, it is possible to enhance the safety in the vehicle by mounting the vehicle lamp.

According to the embodiments of the present invention, it is possible to provide a vehicle lamp capable of changing an irradiation position of a light distribution pattern drawn on a road surface and a vehicle having the vehicle lamp.

DETAILED DESCRIPTION

Hereinafter, an example of an embodiment will be described in detail with reference to the drawings.

First Embodiment

Figure 1:
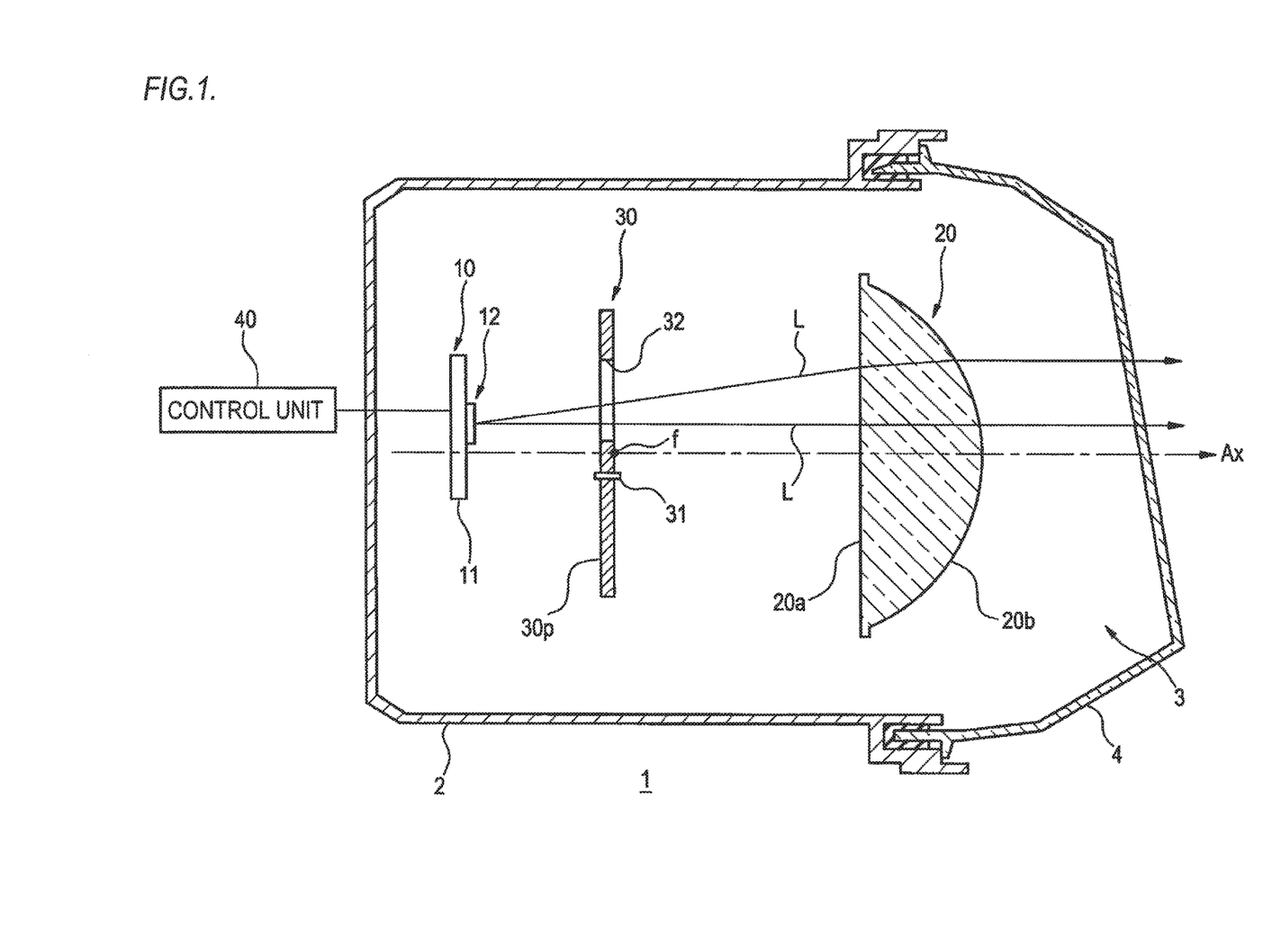
FIG. 1 is a vertical sectional view showing a schematic structure of a vehicle lamp according to a first embodiment.
Figure 2:
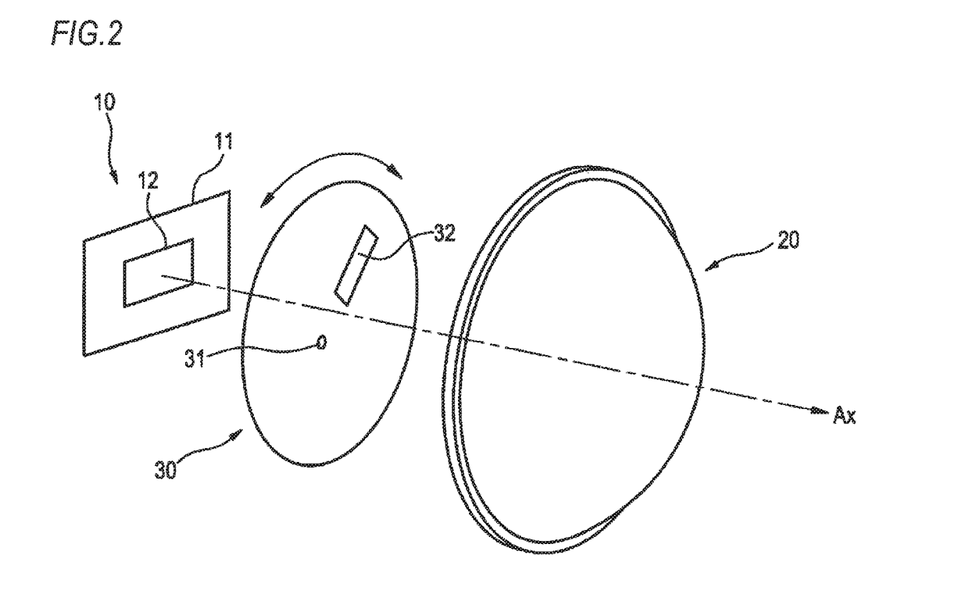
FIG. 2 is a perspective view showing a main configuration lamp according to the first embodiment.

FIG. 1 is a vertical sectional view showing a schematic structure of a vehicle lamp according to a first embodiment, and FIG. 2 is a perspective view showing a main configuration of the vehicle lamp according to the first embodiment.

A vehicle lamp 1 (hereinafter, referred to as a "lamp 1") according to the present embodiment is a lamp unit (road surface drawing device) for drawing a road surface, which is mounted on at least one of a pair of headlamps arranged on the left and right in the vehicle front. FIG. 1 shows, as the lamp 1, a structure of the lamp unit for drawing the road surface, which is mounted on one headlamp.

As shown in FIG. 1, the lamp 1 includes a lamp body 2 having an opening portion on the front side of the vehicle and a translucent cover 4 attached so as to cover the opening portion of the lamp body 2. The translucent cover 4 is formed of a light-transmitting resin or glass or the like. A light source unit 10, a projection lens 20 and a movable shade 30 are accommodated in a lamp chamber 3 which is defined by the lamp body 2 and the translucent cover 4. Each component is attached to the lamp body 2 by a support mechanism (not shown).

As shown in FIG. 1, the light source unit 10 includes a substrate 11 and a light source (e.g., LED chip) 12 for drawing a road surface, which is mounted on the substrate 11. The LED chip 12 is disposed at a position capable of emitting light to the upper side of the movable shade 30 (to be described later). Meanwhile, a semiconductor light emitting element other than the LED chip may be used as the light source. Further, the number of the LED chip 12 may be plural instead of singular. As shown in FIG. 2, the LED chip 12 has a substantially rectangular light emitting surface. Assuming that a width in a left-right direction of a vehicle is 1, it is desirable that an aspect ratio of a width in a left-right direction to a width in an up-down direction of a light source image formed by the light from the LED chip 12 is, for example, 0.5 or more and 1.5 or less. Further, the LED chip 12 can be turned on/off according to a control signal from a control unit 40.

As shown in FIG. 1, the projection lens 20 has an incident surface 20a and a convex emitting surface 20b. The incident surface 20a is disposed to face the light emitting surface of the LED chip 12 and the emitting surface 20b is directed to the front of the lamp. Preferably, an optical axis Ax of the projection lens 20 is directed toward a direction in which light transmitted through the projection lens 20 irradiates a road surface of a predetermined range in front of the lamp.

Meanwhile, a diffusion step can be formed on the incident surface 20a or the emitting surface 20b of the projection lens 20 in order to achieve a desired light distribution pattern. For example, a plurality of cylindrical diffusion steps arranged in parallel along the up-down direction of the lamp may be formed on the incident surface 20a of the projection lens 20. In this way, it is possible to diffuse the light incident on the projection lens 20 in the up-down direction. The diffusion step is not limited to the cylindrical shape but may be a tangent continuous shape step (irregular shape having tangent continuity) or a curvature continuous shape step (irregular shape having curvature continuity). Further, the diffusion step is not limited to the curved shape but may have a triangular shape or the like.

Figure 3:
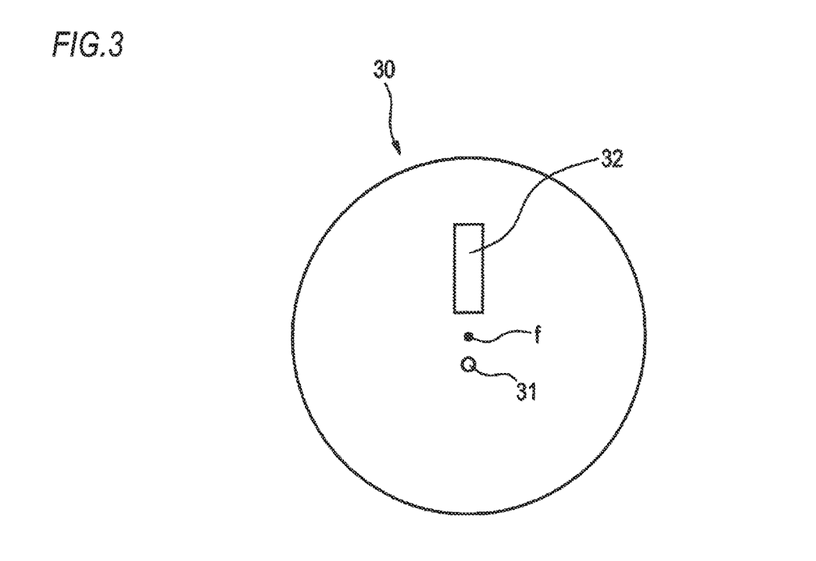
FIG. 3 is a front view of a movable shade according to the first embodiment.

As shown in FIGS. 1 to 3, the movable shade 30 is a circular flat plate-shaped member (an example of the plate-shaped shade or disc-shaped shade) disposed between the light source unit 10 and the projection lens 20. The movable shade 30 is configured such that its light-shielding portion 30p (an example of the light-shielding surface) is disposed along a plane orthogonal to the optical axis Ax of the projection lens 20. The center of the movable shade 30 coincides with a rear focal point f of the projection lens. In FIG. 3, a rotation shaft 31 having a center axis parallel to the optical axis Ax of the projection lens 20 is provided below the center of the movable shade 30. Further, an opening portion 32 (an example of the light-transmitting part) through which a part of light emitted from the LED chip 12 can pass is formed above the center of the movable shade 30. In the present embodiment, the opening portion 32 is formed in a shape (enclosed shape) that is enclosed by the light-shielding portion 30p. The opening portion 32 is opened in a vertically elongated shape extending toward an outer peripheral direction (in this example, upward) from the center side of the movable shade 30. Meanwhile, a transparent glass or a transparent resin or the like for transmitting light may be placed in the opening portion 32 of the movable shade 30, thereby constituting the light-transmitting part.

The turn on/off of the LED chip 12 and the emission intensity adjustment and flashing speed adjustment of light from the LED chip 12 are performed by the control unit 40. The control unit 40 is realized by, as a hardware configuration, an element or circuit such as a CPU or a storage unit of a computer and is realized by, as a software configuration, a computer program or the like. Meanwhile, the control unit 40 is provided on the outside of the lamp chamber 3 in FIG. 1 but may be provided on the inside of the lamp chamber 3. The control unit 40 receives a signal from a lamp switch or the like (not shown) and transmits various control signals to the LED chip 12 according to the received signal.

As shown in FIG. 1, a part of light L emitted from the LED chip 12 passes through the opening portion 32 of the movable shade 30. The light L passing through the linear opening portion 32 forms an elongated light source image. Then, the elongated light source image is incident from the incident surface 20a of the projection lens 20 that is a plano-convex lens and is emitted from the emitting surface 20b as a substantially parallel light that converges toward the optical axis Ax in any direction of the upper and lower directions and the left and right directions. In this way, the light L emitted from the LED chip 12 passes through the light-transmitting part 32 of the movable shade 30 and then passes through the projection lens 20, so that the light is irradiated to the front of the lamp as a vertically elongated linear light distribution pattern (linear light distribution pattern P to be described later).

Figure 4:
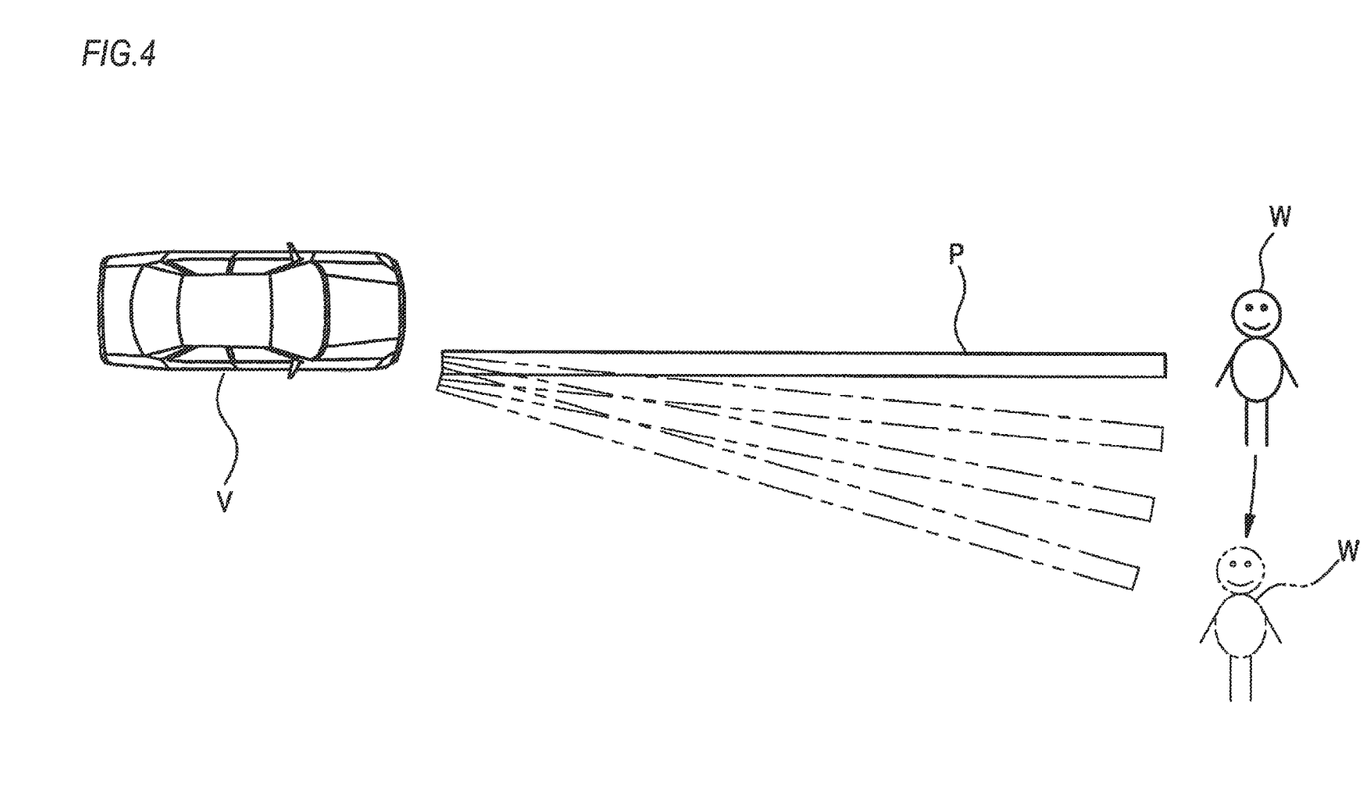
FIG. 4 is a view showing an example of a light distribution pattern that is formed by the lamp of the first embodiment.

FIG. 4 is a view showing an example of a light distribution pattern that is formed by the light irradiated from the lamp 1.

As described above, the light L emitted from the LED chip 12 passes through the opening portion 32 of the movable shade 30 and then passes through the projection lens 20, thereby drawing a vertically elongated (linear) light distribution pattern P on a road surface, as shown in FIG. 4. For example, assuming that a width in a left-right direction of a vehicle is 1, an aspect ratio of a width in a longitudinal direction to a width in a left-right direction of the linear light distribution pattern P is 0.5 or more. The aspect ratio of the linear light distribution pattern P is especially desirable when the aspect ratio of the width in the longitudinal direction to the width in the left-right direction is 1:10 or more. Thereby, the linear light distribution pattern P can irradiate, for example, the range of 10 meters to 100 meters in front of the vehicle. In the case where a vertically elongated linear light distribution pattern having an aspect ratio greater than in the above example is required, it is possible to correspond by increasing an aspect ratio (longitudinal/lateral ratio) of the opening portion 32 of the movable shade 30 or changing a magnification ratio of a light source image by the projection lens 20.

In the present embodiment, the movable shade 30 includes the rotational axis 31. Therefore, when the movable shade 30 is rotated around the rotational axis 31, the opening portion 32 is moved along the rotation direction of the movable shade 30. In this way, the linear light distribution pattern P drawn on a road surface in front of the lamp can be moved in the normal direction (radial direction). As shown in FIG. 4, the movable shade 30 is rotated in accordance with the movement of a pedestrian W when the pedestrian W as an object moves to the left and right. Thereby, the irradiation position can be changed so that the linear light distribution pattern P is irradiated toward the position where the pedestrian W is present.

As described above, in the present embodiment, the LED chip 12, the projection lens 20 for transmitting light emitted from the LED chip 12 and the movable shade 30 disposed in the vicinity of the rear focal point f of the projection lens 20 are included. The movable shade 30 is formed in a circular flat-plate shape which has the light-shielding portion 30p disposed along the direction orthogonal to the optical axis Ax of the projection lens 20. The opening portion 32 having an enclosed shape is formed in the movable shade 30. Further, the opening portion 32 is configured to move along the rotation direction when the movable shade 30 is rotated around the rotational axis 31. According to this lamp 1, the irradiation position of the linear light distribution pattern P drawn on the road surface can be easily changed. Further, by providing the movable shade 30 in the lamp 1, it is sufficient to have at least one LED chip 12. Therefore, the movement of the irradiation position of the linear light distribution pattern P can be realized by a smaller number of light sources than in the prior art.

Figure 5:
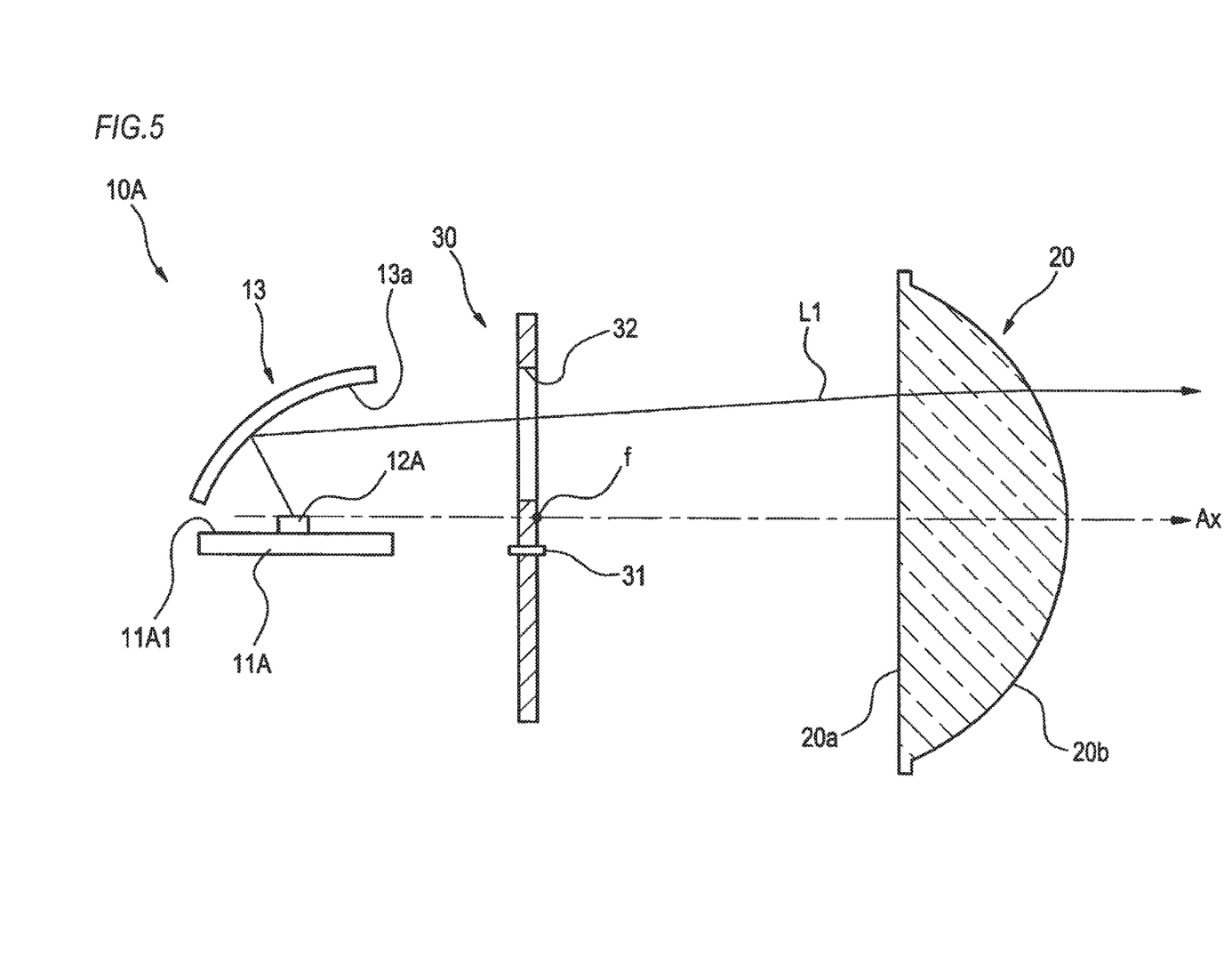
FIG. 5 is a vertical sectional view showing a vehicle lamp according to a modification of the first embodiment.

FIG. 5 is a vertical sectional view showing a lamp for drawing a road surface according to a modification of the first embodiment.

The lamp according to the present modification includes a light source unit 10A, the projection lens 20 and the movable shade 30. The light source unit 10A includes a substrate 11A, at least one LED chip 12A mounted on the substrate 11A, and the reflector 13. The substrate 11A is disposed such that its chip mounting surface 11A1 is substantially parallel to the optical axis Ax of the projection lens 20. The reflector 13 is disposed above the substrate 11A and has an elliptical reflecting surface 13a for reflecting light emitted from the LED chip 12A toward the projection lens 20.

As shown in FIG. 5, the light L1 emitted from the LED chip 12A is reflected by the elliptical reflecting surface 13a of the reflector 13 and a part thereof passes through the opening portion 32 of the movable shade 30. A light source image, which is longer in the up-down direction than in the left-right direction of the lamp, is formed by the light L1 passing through the opening portion 32. The light source image, which is longer in the up-down direction than in the left-right direction, is transmitted through the projection lens 20 and then emitted to the front of the lamp. In this way, also in this modification, the light L1 passing through the light-transmitting part 32 of the movable shade 30 can form the linear light distribution pattern P (see FIG. 4) which is longer in the longitudinal direction than in the left-right direction.

Meanwhile, in addition to using the LED chips 12, 12A, a light source bulb may be used as the light source. For example, the light source bulb is constituted by an incandescent lamp having a filament, such as a halogen lamp. The light source bulb includes a reflector that is formed in a cup shape. An insertion hole through which the halogen lamp is inserted is provided at the center of the reflector. In the case of using the light source bulb, the light from the light source bulb is reflected toward the front by the reflector and only the light passing through the opening portion 32 of the movable shade 30 is irradiated to the front through the projection lens 20. Meanwhile, as the light source bulb, other types of light source such as a discharge lamp may be adopted.

Figure 6:
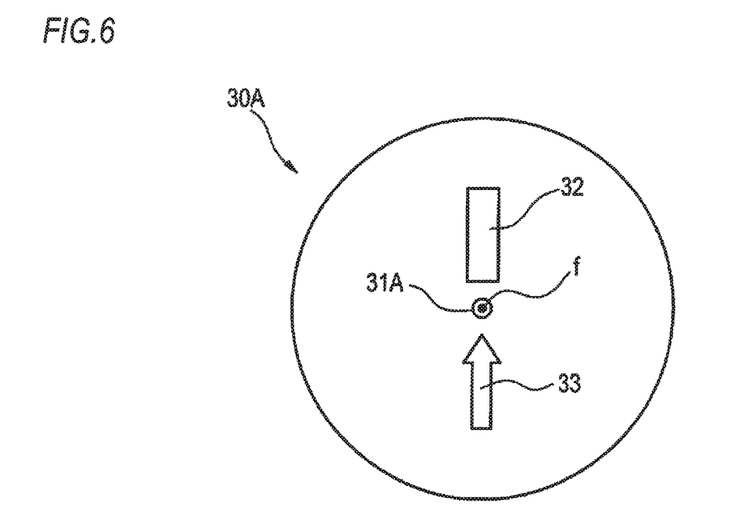
FIG. 6 is a front view of a movable shade according to another modification of the first embodiment.

FIG. 6 is a front view of a movable shade according to another modification of the first embodiment.

As shown in FIG. 6, a movable shade 30A has a rotational axis 31A near its center (the rear focal point f of the projection lens 20) and includes a plurality of opening portions 32, 33 up and down so as to sandwich the rotational axis 31A. Specifically, a rectangular opening portion 32 is formed on the upper portion of the movable shade 30A and an upward arrow-shaped opening portion 33 is formed on the lower portion of the movable shade 30A. The rectangular opening portion 32 is extended in a vertically elongated shape upward from the center side of the movable shade 30A. Similar to the first embodiment, the LED chip 12 is disposed at a position capable of emitting light to the upper side of the movable shade 30A. That is, the light passing through the opening portion (the opening portion 32 or the opening portion 33) located on the upper portion of the movable shade 30A is irradiated to the front of the lamp. Therefore, by rotating the movable shade 30A around the rotational axis 31A, and thus, changing the position of the opening portions 32, 33, the linear light distribution pattern formed by the opening portion 32 or the arrow-shaped light distribution pattern formed by the opening portion 33 can be drawn on the road surface. When the movable shade 30A is rotated by 180 degrees from the state shown in FIG. 6, the light emitted from the LED chip 12 passes through the arrow-shaped opening portion 32. At this time, an image projected on the front of the lamp through the projection lens 20 is inverted up and down. Therefore, a light distribution pattern in which the front side of the lamp is a head (arrow direction) of the arrow can be formed by the light source image that is formed by the light passing through the downward arrow-shaped opening portion 33.

Second Embodiment

Figure 7:
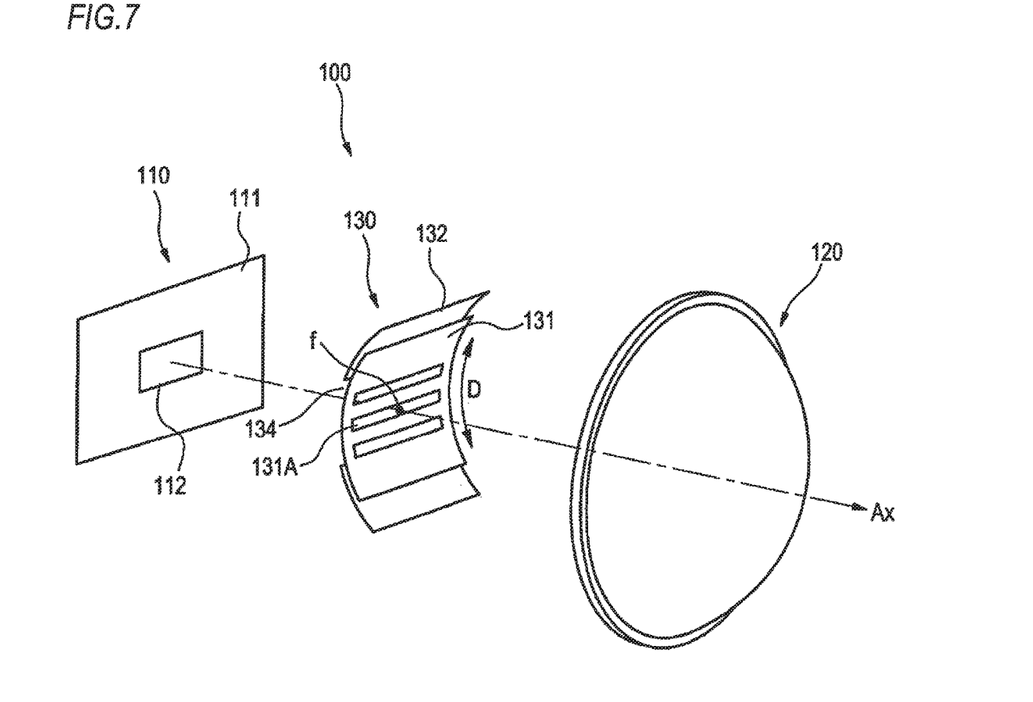
FIG. 7 is a perspective view showing a schematic structure of a vehicle lamp according to a second embodiment of the present invention.
Figure 8:
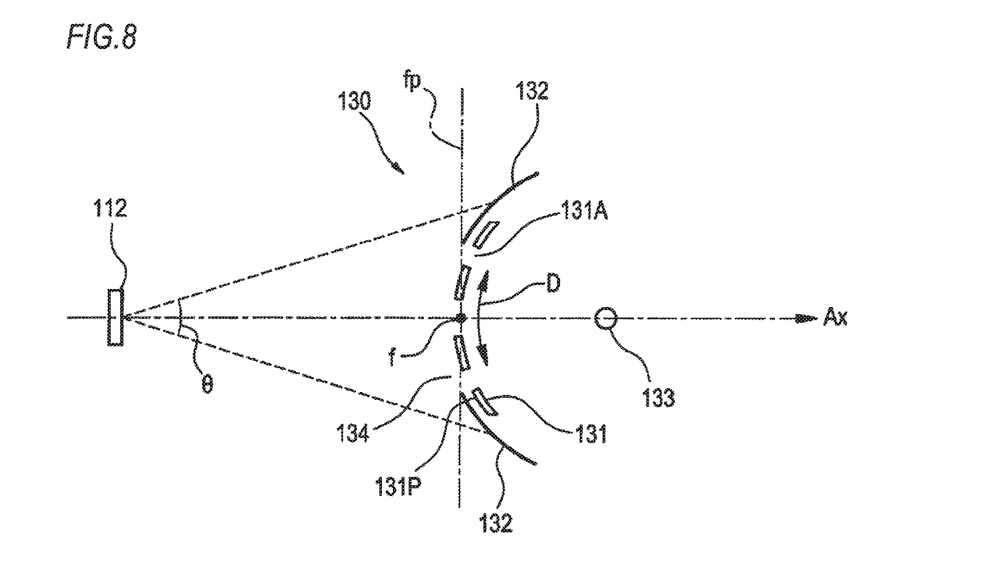
FIG. 8 is a vertical sectional view showing a shade unit according to the second embodiment.

FIG. 7 is a perspective view showing a schematic structure of a lamp for drawing a road surface according to a second embodiment, and FIG. 8 is a vertical sectional view showing a shade unit according to the second embodiment.

A lamp 100 according to the present embodiment is a lamp unit (road surface drawing device) for drawing a road surface, which is mounted on at least one of a pair of headlamps arranged on the left and right in the vehicle front. FIG. 7 shows, as the lamp 100, a structure of the lamp unit for drawing the road surface, which is mounted on one headlamp. The lamp body and the translucent cover are not shown in FIG. 7.

As shown in FIG. 7, the lamp 100 includes a light source unit 110, a projection lens 120, and a shade unit 130. Each component is attached to the lamp body by a support mechanism (not shown). Since the configuration of the light source unit 110 is the same as that of the light source unit 10 of the first embodiment and the configuration of the projection lens 120 is the same as that of the protection lens 20 of the first embodiment, a detailed description thereof is omitted.

As shown in FIGS. 7 and 8, the shade unit 130 is composed of a movable shade 131 and a pair of fixed shades 132. The movable shade 131 is disposed near the focal point f of the projection lens 120 and is configured as a member formed by a cylinder or a part of a cylinder. That is, the movable shade 131 is configured such that its light-shielding surface 131p is curved with respect to a vertical plane fp orthogonal to the optical axis Ax of the projection lens 120. The movable shade 131 has a rotational axis 133 extending in the horizontal direction at its vehicle front side. The movable shade 131 is provided to be pivotable about the rotational axis 133 along the rotation direction D. The movable shade 131 is formed with a plurality of (in this example, three) opening portions 131A (an example of the linear opening portion) which is arranged in the up-down direction. Each of the opening portions extends long in a direction substantially orthogonal to the rotation direction D. Meanwhile, the plurality of opening portions 131A may be formed so as to extend obliquely with respect to the rotation direction D.

The pair of fixed shades 132 is disposed on the rear side of the movable shade 131, i.e., between the LED chip 112 and the movable shade 131. The pair of fixed shades 132 is spaced apart from each other at the upper portion and lower portion of a region of an emission angle θ of the light emitted from the LED chip 112. The pair of fixed shades 132 is adapted to cover at least a partial region of the movable shade 131 in the rotation direction D. That is, the pair of fixed shades 132 is provided at a position of shielding the light emitted toward at least a part of the movable shade 131 in the rotation direction D. An opening portion formed between the pair of fixed shades 132 spaced apart from each other is defined as an open gap 134. Meanwhile, the shape, number or arrangement of the fixed shade is not limited to the example shown in FIG. 7 or the like.

Figure 9:
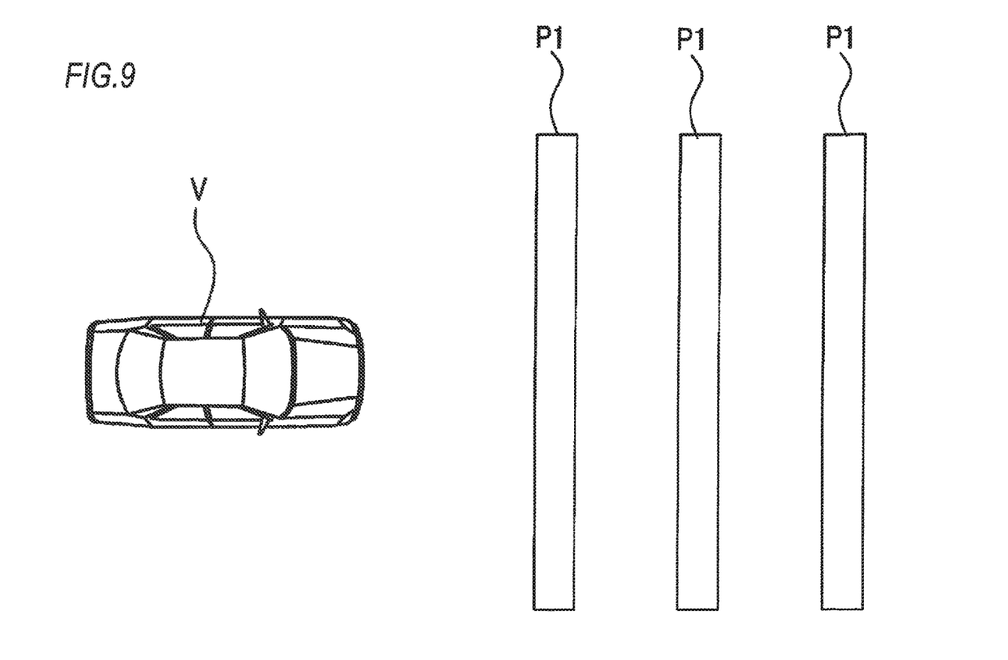
FIG. 9 is a view showing an example of a light distribution pattern that is formed by the lamp of the second embodiment.

According to this lamp 100, a part of the light emitted from the LED chip 112 passes through the open gap 134 between the pair of fixed shades 132. A part of the light passing through the open gap 134 is shielded by the movable shade 131 and only the light passing through the plurality of opening portions 131A is incident on the projection lens 120. That is, the light passing through the plurality of opening portions 131A is transmitted through the projection lens 120 as a laterally elongated light source image which is longer in the left-right direction than in the up-down direction. In this way, as shown in FIG. 9, a plurality of (in this example, three) laterally elongated light distribution patterns P1, which is elongated in the left-right direction of the lamp, can be drawn on the road surface in front of the vehicle V.

The movable shade 131 is freely pivotable along the rotation direction D about the rotational axis 133. Therefore, it is possible to change the number of the laterally elongated light distribution patterns P1 formed on the road surface by rotating the movable shade 131 and thus changing the position of the plurality of opening portions 131A to the open gap 134 between the fixed shades 132. For example, FIGS. 10A to 10D show a state where the movable shade 131 is rotationally moved stepwise and an illuminance distribution on a virtual screen of the laterally elongated light distribution patterns P1 that are formed at each movement position of the movable shade 131. In FIGS. 10A to 10D, the movable shade 131 is provided at its center region with five linear opening portions 131A arranged in parallel in the up-down direction.

Figures 10A, 10B, 10C, 10D:
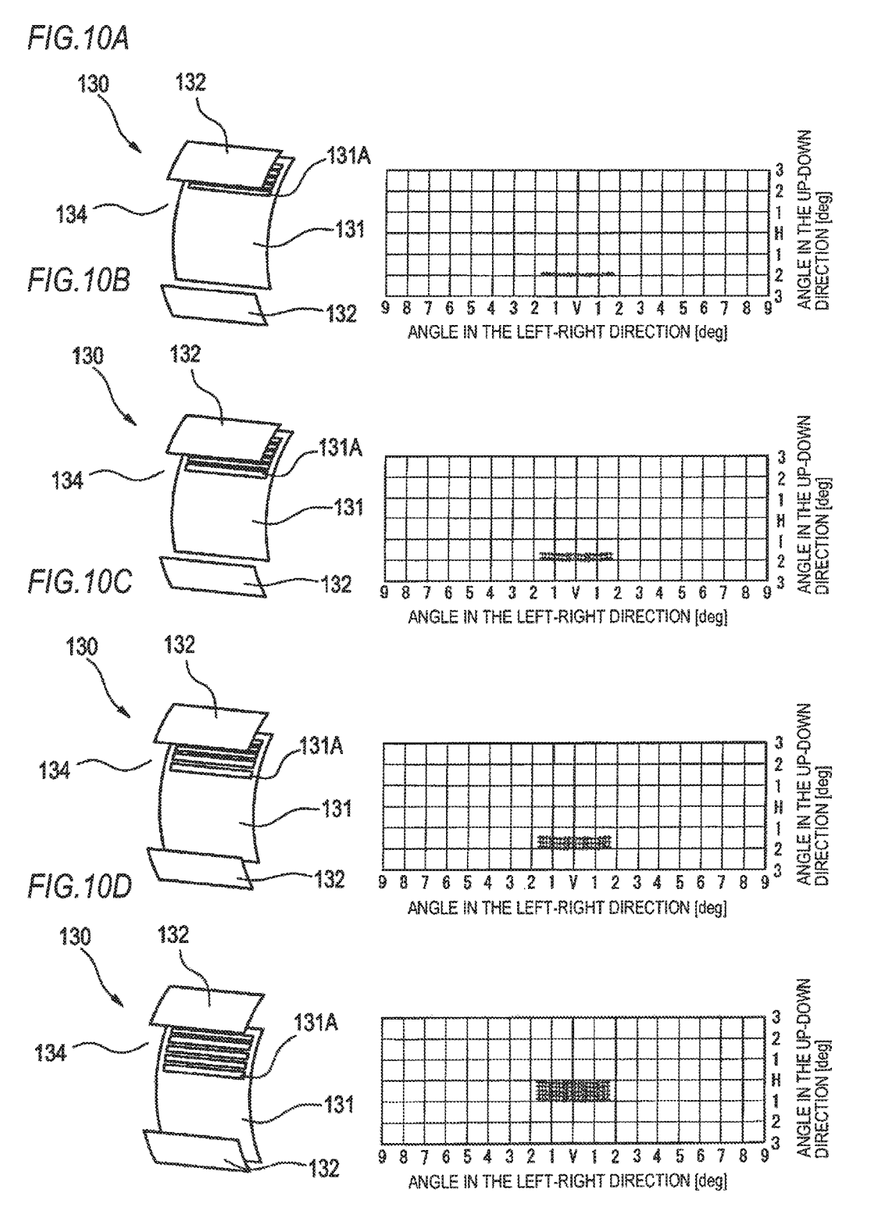
FIGS. 10A to 10D are views showing a state where the movable shade is moved stepwise and an illuminance distribution on a virtual screen of a light distribution pattern that is formed at each movement position of the movable shade.

FIG. 10A shows a state where only the lowermost opening portion 131A of the plurality of opening portions 131A of the movable shade 131 is disposed in the open gap 134 between the pair of fixed shades 132 and the opening portions 131A other than the lowermost one are disposed to be covered by the fixed shades 132. When the movable shade 131 is rotated to such a position, the light emitted from the LED chip 112 and passing through the open gap 134 passes through only the lowermost opening portion 131A of the movable shade 131, and then, is irradiated to the front of the lamp through the projection lens 120. Therefore, as illustrated by the illuminance distribution diagram shown in FIG. 10A, only one laterally elongated light distribution pattern is drawn on the road surface.

Subsequently, the movable shade 131 is slightly rotated downward from the state shown in FIG. 10A, and thus, two opening portions 131 on the lower side are disposed in the open gap 134 between the pair of fixed shades 132 as shown in FIG. 10B. Then, as illustrated by the illuminance distribution diagram shown in FIG. 10B, two laterally elongated light distribution patterns are drawn on the road surface.

Subsequently, as shown in FIGS. 10C and 10D, when the movable shade 131 is further rotated downward, the number of the opening portions 131A disposed in the open gap 134 between the pair of fixed shades 132 is increased. In this way, as illustrated by the illuminance distribution diagrams shown in FIGS. 10C and 10D, the number of the laterally elongated light distribution patterns to be drawn on the road surface is increased stepwise.

In the second embodiment as described above, a part of the light from the LED chip 112 is shielded by the movable shade 131 including the plurality of opening portions 131A, so that a plurality of laterally elongated light distribution patterns P1 can be irradiated toward a direction in which a pedestrian is present, for example. Further, by rotating the movable shade 131 around the rotational axis 133 extending in the horizontal direction and thus changing the number of the plurality of opening portions 131A positioned in the open gap 134 between the pair of fixed shades 132, the number of the laterally elongated light distribution patterns P1 can be increased or decreased stepwise. Therefore, for example, by rotating the movable shade 131 such that the laterally elongated light distribution patterns P1 are increased toward a site remote from the vicinity of the vehicle, it is possible to notify a pedestrian of the approach of the vehicle V. Further, since the lamp 100 including the shade unit 130 only needs to have at least one LED chip 112, a smaller number of light sources than in the prior art can form a plurality of laterally elongated light distribution patterns P1 and realize the movement of the laterally elongated light distribution patterns P1.

Figure 11:
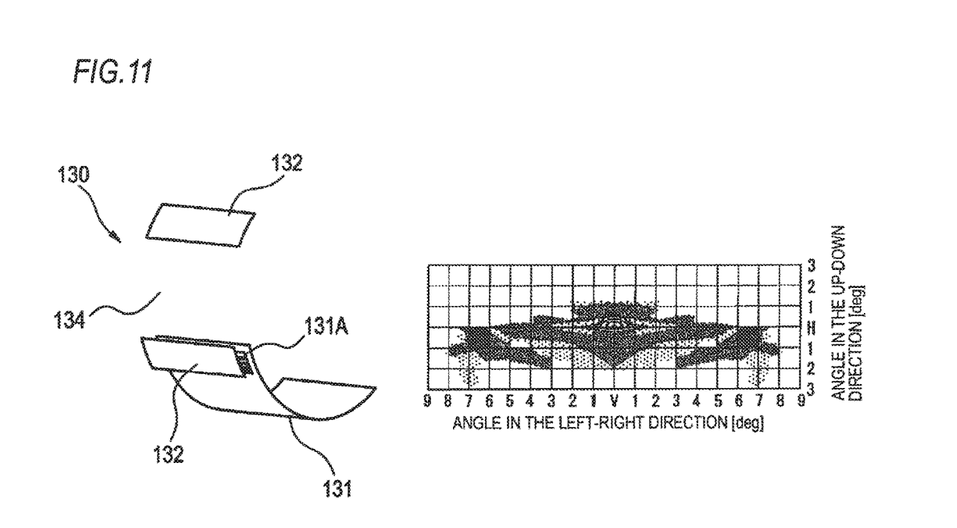
FIG. 11 is a view showing a state where the movable shade is fully opened with respect to a fixed shade and an illuminance distribution on a virtual screen of a light distribution pattern that is formed in the state where the movable shade is fully opened.

Meanwhile, in the present embodiment, the movable shade 131 may be largely pivoted downward, and thus, the movable shade 131 may be moved to a position of fully opening the open gap 134 between the pair of fixed shades 132, as shown in FIG. 11. When the movable shade 131 is in the fully opened state in this manner, the light travelling through the open gap 134 from the LED chip 112 is not blocked by the movable shade 131. In this way, it is possible to form a light distribution pattern for forward irradiation with a wide irradiation area, in particular, a high-beam light distribution pattern, as illustrated by the illuminance distribution diagram shown in FIG. 11.

Further, in the present embodiment, the movable shade 131 is configured to rotate in the rotation direction D about the rotational axis 133 extending in the horizontal direction. However, the present invention is not limited to this embodiment. For example, the movable shade may be curved with respect to the horizontal plane orthogonal to the optical axis Ax and may be rotated about the rotational axis extending in the vertical direction. According to this configuration, the light distribution pattern which is extended largely in the up-down direction than in the left-right direction of the lamp can be drawn on the road surface by the light passing through the vertically elongated opening portion formed in the movable shade.

Figure 12:
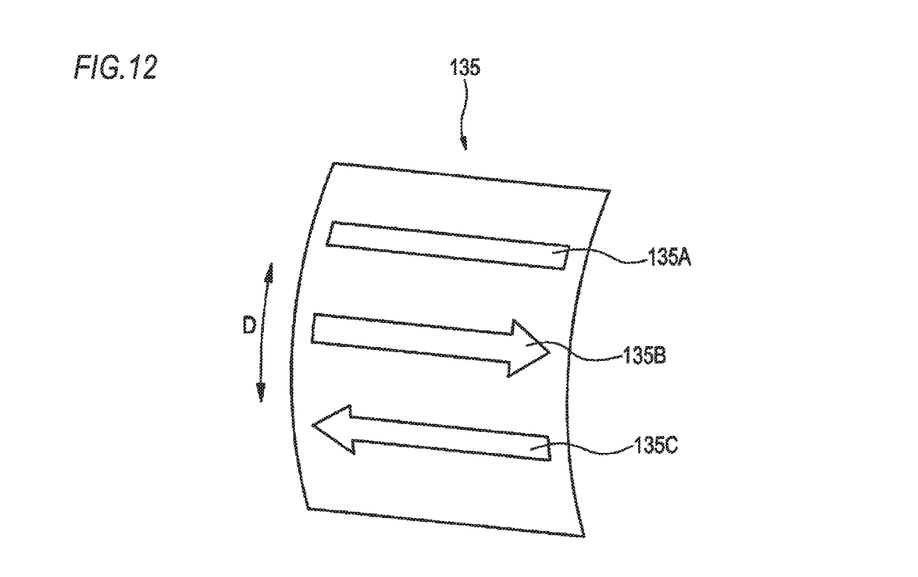
FIG. 12 is a perspective view showing a movable shade and a fixed shade according to another modification of the second embodiment.

FIG. 12 is a view showing a movable shade according to a modification of the second embodiment.

As shown in FIG. 12, the shapes of a plurality of opening portions formed in the movable shade may be different from each other. In a movable shade 135 shown in FIG. 12, in addition to a laterally elongated rectangular opening portion 135A, arrow-shaped opening portions 135B, 135C are formed. In the lamp having such movable shade 135, the movable shade 135 is rotated in the rotation direction D, so that the turn on/off of the LED chip is controlled while suitably changing an opening portion disposed in an opening between the pair of fixed shades 132 or the number of the opening portion. In this way, it is possible to draw various light distribution patterns on the road surface in accordance with the road conditions.

Third Embodiment

Figure 13:
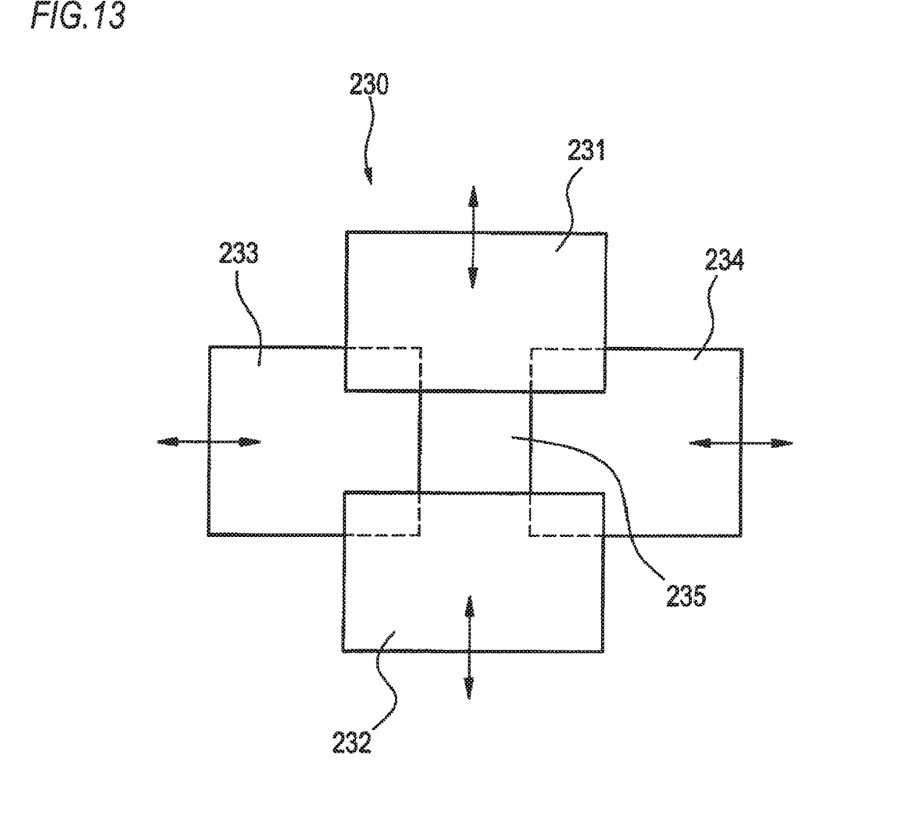
FIG. 13 is a front view of a movable shade according to a third embodiment.

FIG. 13 is a front view of a movable shade according to a third embodiment. As the light source unit and the projection lens, the light source unit and the projection lens of the first and second embodiments can be used.

As shown in FIG. 13, a movable shade 230 according to the third embodiment is constituted by four plate-shaped shades 231 to 234. In the present embodiment, a first plate-shaped shade 231 and a second plate-shaped shade 232 are arranged so as to be spaced apart from each other in the up-down direction, and a third plate-shaped shade 233 and a fourth plate-shaped shade 234 are arranged such that a part of upper and lower regions thereof overlaps with the first and second plate-shaped shades 231, 232 while being spaced apart from each other in the left-right direction. A part enclosed by these plate-shaped shades 231 to 234 forms a rectangular opening portion 235. Each of the plate-shaped shades 231 to 234 is supported on a moving mechanism (not shown). The first and second plate-shaped shades 231, 232 can be moved in the up-down direction and the third and fourth plate-shaped shades 233, 234 can be moved in the left-right direction. Therefore, the shape (aspect ratio; longitudinal/lateral ratio) of the opening portion 235 enclosed by these plate-shaped shades 231 to 234 can be suitably changed by moving each of the plate-shaped shades 231 to 234. Thus, according to the configuration of the third embodiment, a desired light distribution pattern can be easily drawn at a desired position on a road surface in accordance with the road conditions or the like by respectively moving the plate-shaped shades 231 to 234.

Fourth Embodiment

Figure 14:
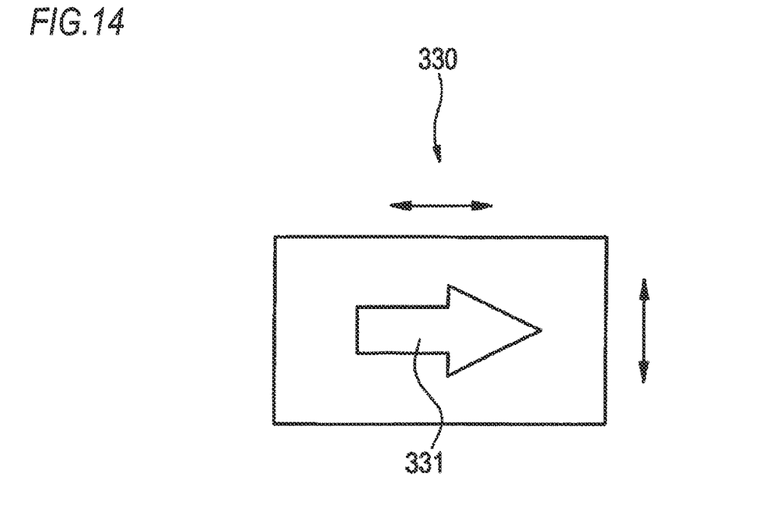
FIG. 14 is a front view of a movable shade according to a fourth embodiment.

FIG. 14 is a front view of a movable shade according to a fourth embodiment. As the light source unit and the projection lens, the light source unit and the projection lens of the first and second embodiments can be used.

As shown in FIG. 14, a movable shade 330 according to the fourth embodiment is constituted by a single flat plate-shaped shade. The movable shade 330 is formed with an arrow-shaped opening portion 331, for example. The movable shade 330 is supported on a moving mechanism (not shown) and can be moved in the up-down direction and the left-right direction. Therefore, the position of the opening portion 331 can be suitably changed by moving the movable shade 330 in the up-down direction and the left-right direction. In this way, it is possible to easily change the irradiation position on the road surface of the light distribution pattern that is formed by the light passing through the opening portion 331 of the movable shade 330.

In the foregoing, the embodiments of the present invention have been exemplified. However, the present invention is not limited to the above embodiments but may employ other configurations, as necessary.

The invention claimed is:

1. A vehicle lamp comprising:
    a light source configured to draw a road surface;
    a projection lens configured to transmit light emitted from the light source; and
    a movable shade disposed in the vicinity of a rear focal point of the projection lens,
    wherein the movable shade is rotatable and comprises at least one plate-shaped shade which has a light-shielding surface along a direction orthogonal to an optical axis of the projection lens, and
    wherein the at least one plate-shaped shade is formed with at least one light-transmitting part having an enclosed rectangular shape that draws a rectangular light distribution pattern on the road surface.

2. The vehicle lamp according to claim 1,
    wherein the at least one light-transmitting part is moved by rotating the movable shade.

3. The vehicle lamp according to claim 2,
    wherein the movable shade is constituted by a disc-shaped shade, wherein the disc-shaped shade has a rotational axis parallel to the optical axis and an opening portion which is formed so as to extend in an outer peripheral direction from a center of the disc-shaped shade and thus constitutes the at least one light-transmitting part, and
wherein the disc-shaped shade is rotated around the rotational axis.

4. The vehicle lamp according to claim 2,
wherein the rear focal point of the projection lens is disposed between the at least one light-transmitting part and a rotation shaft that rotates the movable shade.

5. A vehicle comprising the vehicle lamp according to claim 1.

6. The vehicle lamp according to claim 1,
wherein the light source is disposed above the optical axis of the projection lens.

7. The vehicle lamp according to claim 1,
wherein the at least one plate-shaped shade further comprises an arrow-shaped opening portion that draws an arrow-shaped light distribution pattern on the road surface.

8. The vehicle lamp according to claim 1,
wherein the rectangular light distribution pattern is rotatable.

9. A vehicle lamp comprising:
a light source configured to draw a road surface;
a projection lens configured to transmit light emitted from the light source; and
a movable shade disposed in the vicinity of a rear focal point of the projection lens,
wherein the movable shade comprises at least one cylinder or partial cylinder-shaped shade which has a curved light-shielding surface that curves around a center axis that is orthogonal to an optical axis of the projection lens, and
wherein the at least one cylinder or partial cylinder-shaped shade is formed with at least one light-transmitting part having an enclosed rectangular shape that draws a rectangular light distribution pattern on the road; wherein the at least one plate-shaped shade further comprises an arrow-shaped opening portion that draws an arrow-shaped light distribution pattern on the road surface.

10. The vehicle lamp according to claim 9,
wherein the movable shade is rotated about a rotational axis along a horizontal direction or a vertical direction, and
wherein the rotational axis is outside of the movable shade.

11. The vehicle lamp according to claim 10,
wherein the light-transmitting part is constituted by a plurality of linear opening portions which extends long in a direction perpendicular to a rotation direction or in a direction inclined with respect to the rotation direction.

12. The vehicle lamp according to claim 9,
wherein the vehicle lamp further includes a fixed shade disposed between the light source and the movable shade, and
wherein the fixed shade is provided at a position where the fixed shade is capable of shielding light emitted toward at least a part of the movable shade in a rotation direction.

13. The vehicle lamp according to claim 12,
wherein the movable shade is rotated about a rotational axis along the horizontal direction or the vertical direction, so that the movable shade is movable to a position where the movable shade does not shield light which travels from the light source toward the projection lens through the fixed shade.

14. The vehicle lamp according to claim 9,
wherein the at least one shade is rotatable about a rotation axis in an arc.

15. A vehicle lamp comprising:
a light source configured to draw a road surface;
a projection lens configured to transmit light emitted from the light source; and
a movable shade disposed in the vicinity of a rear focal point of the projection lens,
wherein the movable shade comprises at least one plate-shaped shade which has a light-shielding surface along a direction orthogonal to an optical axis of the projection lens,
wherein the at least one plate-shaped shade is formed with at least one light-transmitting part having an enclosed shape, and
wherein the at least one plate-shaped shade is movable in a vertical direction and a lateral direction perpendicular to both the optical axis of the projection and the vertical direction.

16. The vehicle lamp according to claim 15,
wherein the at least one shade comprises a first shade movable in the vertical direction, and a second shade movable in the lateral direction.

17. The vehicle lamp according to claim 15,
wherein the at least one shade comprises a single shade that is movable in both the vertical direction and the lateral direction.

18. The vehicle lamp according to claim 15,
wherein the at least one plate-shaped shade further comprises an arrow-shaped opening portion that draws an arrow-shaped light distribution pattern on the road surface.

* * * * *